Jan. 7, 1930.　　　W. DUBILIER　　　1,742,759
ELECTRICAL CONDENSER
Filed Feb. 2, 1925　　　2 Sheets-Sheet 1
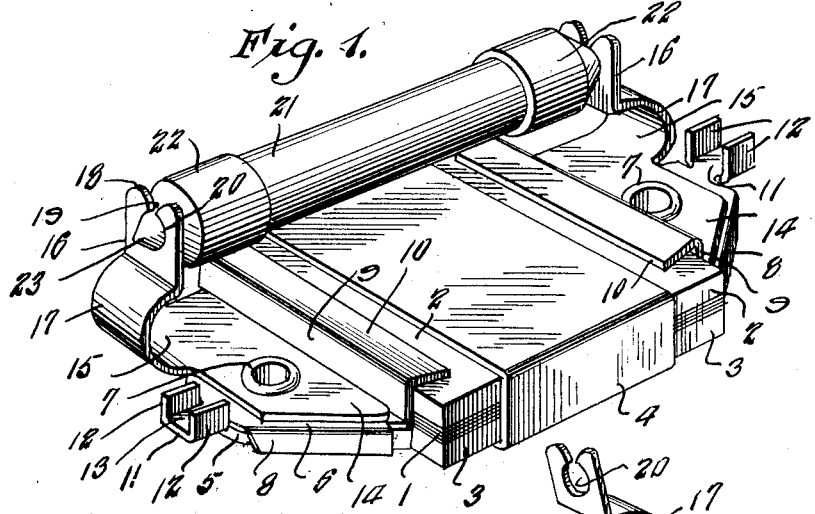
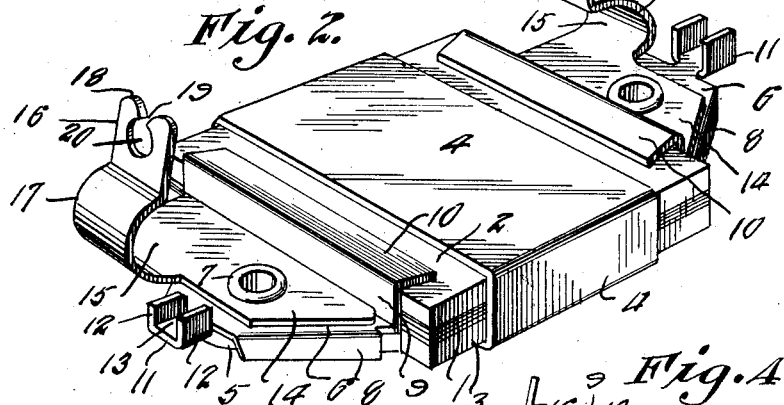
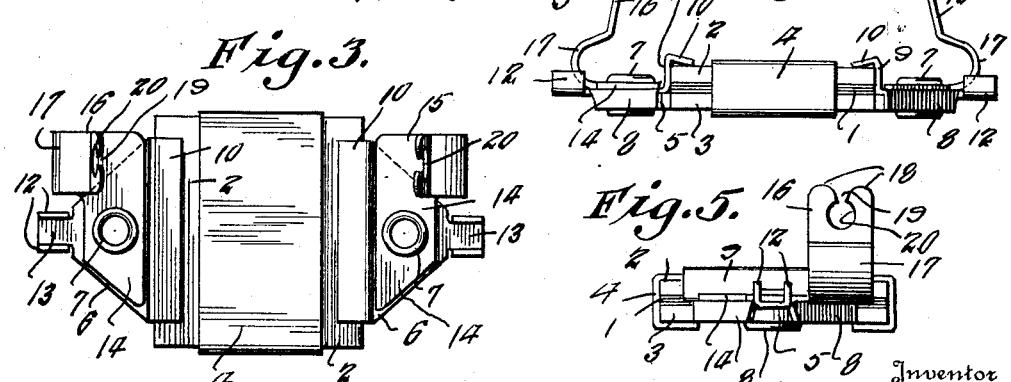
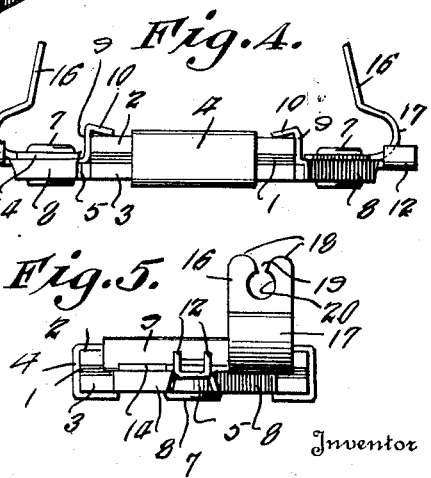
Inventor
WILLIAM DUBILIER
By Van Deventer & Nickel
Attorneys

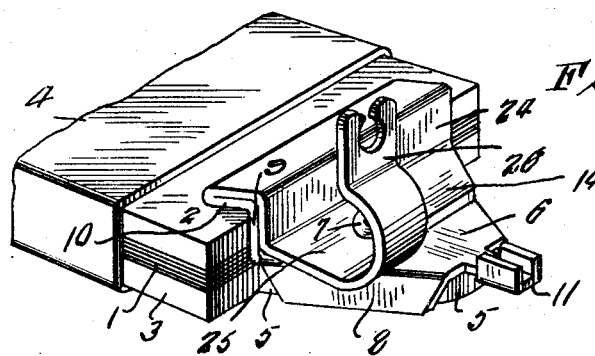
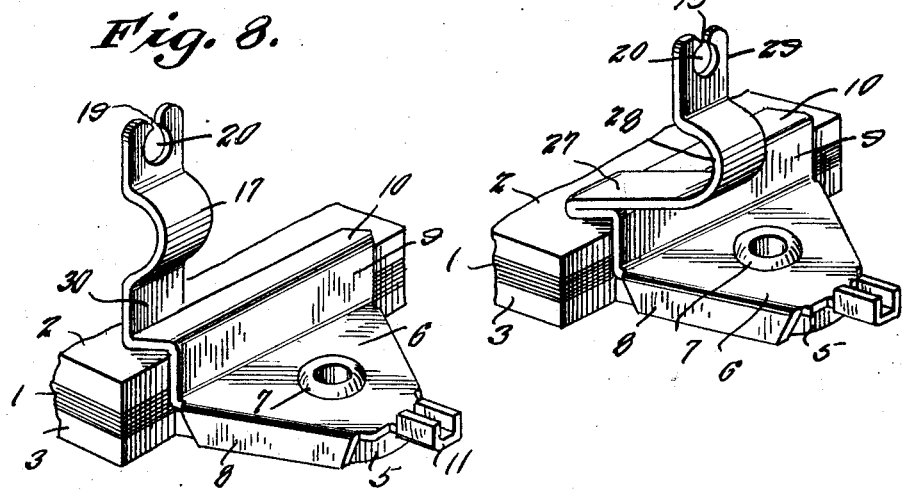
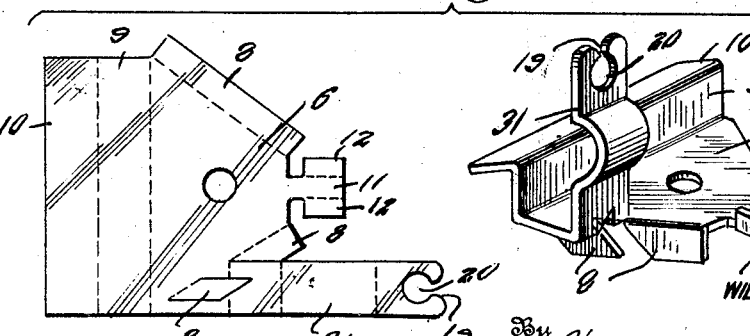
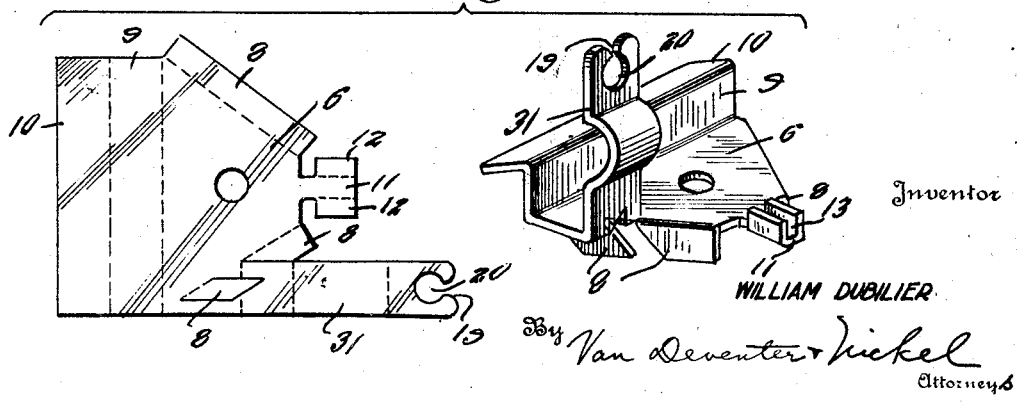

Patented Jan. 7, 1930

1,742,759

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRICAL CONDENSER

Application filed February 2, 1925. Serial No. 6,374.

This invention has relation to electrical devices, and particularly to electrical condensers.

An object of the invention is the production of a condenser having means whereby a grid leak may be easily and quickly mounted or demounted. The mounting is of such a character that sufficient pressure is brought to bear upon the grid leak terminals to insure a perfect contact at all times.

Another object of this invention is the production of a condenser which is compact, unique and durable, composed of but few parts clamped together by a clip having integral means whereby a grid leak may be inserted or removed at will with the greatest of ease, and when inserted will be sustained in a line off center, in a plane above and parallel with respect to the condenser.

A further object of this invention is the production of a condenser mounting having integral therewith a grid leak mounting, the grid leak mounting being so constructed, arranged and located with relation to the condenser mounting that the condenser can be readily placed in circuit without danger to the grid leak mounting or disturbing the grid leak supported therein.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a perspective view of a condenser illustrating my improved grid leak clip with a grid leak supported therein;

Fig. 2 is a like view with the grid leak removed;

Fig. 3 is a top plan view with the grid leak removed;

Fig. 4 is a side elevation, illustrating the position of the grid leak clips upon the removal of the grid leak;

Fig. 5 is an end elevation illustrating the position of the grid leak clip relative to the condenser;

Fig. 6 is a perspective view partly broken away illustrating a modification wherein the clamping flange is doubled;

Fig. 7 is a perspective view partly broken away of another modification wherein the grid leak clip is integral with the clamping flange and is formed with a sweeping backward curve;

Fig. 8 is a perspective view partly broken away of another modification, illustrating the grid leak clip integral with the clamping flange in a position perpendicular to the condenser; and Fig. 9 is a further modification illustrating a top plan view of the stamped or cut blank and a perspective view of the complete device.

Referring by numerals to the drawings, and more particularly to Figs. 1 to 5 inclusive, 1 represents a series of dielectric and conductive plates constituting the condenser unit proper clamped between sheets or plates 2 and 3 of non-conducting material, by means of a transverse metallic strip 4, the free ends of which are clamped around the opposite edges of the respective plates so as to firmly bind the whole together. The non-conducting plate 3 is provided upon its opposite ends with integral V-shaped elongations 5, mounted upon which are corresponding clips 6, secured to the elongations 5 by means of rivets 7; however, it is obvious that they may be otherwise secured.

The clips 6 are provided with flanges 8, bent down upon the diverging edges of the elongations 5, so as to better retain the clips in position. Flanges 9 are formed on the clips 6 abutting the edges of the plate 2, with their free ends bent down upon the plate 2, as at 10, in order to produce a better binding force between the plates 2 and 3. The clips 6 are further provided at the apex of the V-shaped elongations with terminals 11 formed by the production of a substantially T-shaped lug, the arms 12 of which are bent up at right angles to the body or stem portion so as to form a U-shaped channel 13 adapted to receive a lead (not shown), which is secured therein for folding and clamping the arms 12 over the same.

Secured upon the top of the clip 6 is a plate 14 made to conform with the shape of the body of the clip 6, and having integral therewith, and in the same plane, a shoulder 15, with an arm 16 bent upward with a curved portion 17, so as to increase its springing or binding force. The free ends of the arms 16 are rounded, as at 18, and are provided with V-shaped slots 19 terminating in orifices 20, thus affording an adequate support for a grid leak 21, the terminals 22 of which are conical, as shown at 23, so as to slide smoothly through the slots 19 and engage the orifices 20, and to be firmly held therein by the tension of the spring actuated arms or clips.

It will thus be seen that a grid leak clip so formed will support the grid leak in a readily removable yet rigid manner, in a line off center, in a plane above and parallel with respect to the condenser. The plate 14 adds to the stiffness and strength of the triangular extension of the insulating plate 3.

In Fig. 6 I have shown a modification wherein the clip or plate 6 is identical, the point of difference involved being that the flange 9, which is bent down as shown at 10, has formed integral therewith an elongation 24. This elongation is bent back over the flange 9 and down against the clip or plate 6. It is made to conform with the clip or plate 6 and is provided with a shoulder 25 supporting an arm 26. The shoulder 25 and the arm 26 are of identically the same construction as the shoulder 15 and the arm 16, and will function in the same manner.

The advantages obtained by this form of clip and grid leak support are many and varied and are clearly apparent. The integral formation of the clip and grid leak support admits of the complete device being stamped or punched at one and the same operation, thus materially reducing the cost of manufacture and producing a more rigid structure, besides effecting a saving in labor and incidentally the cost of assembling.

It is to be noted that in this particular form of clip and grid leak support great strength and rigidity are produced by virtue of the doubling, and particularly the doubling of the flange 9 and its downwardly diverging edge 10, which is brought to bear against the plate with more force and will withstand greater stress, which is particularly desirable, since it is of the greatest importance to sustain the condenser unit under a constant and uniform pressure.

In Fig. 7 I have shown another modification wherein the flange 9 has an integral arm 27 bent back upon the portion 10 of the flange 9, and diverging with a gradual sweeping curve forming a spring 28, terminating with a perpendicular end portion 29, having the same means for engaging the grid leak terminals as previously described.

This form of clip and grid leak support is particularly desirable owing to its simplicity, and to the reduced cost of manufacturing and assembling. However, its predominating feature is embodied in the graceful gradual sweeping spring actuated grid leak clip which, owing to its particular formation, exerts a greatly increased pressure on the terminals of the removable grid leak. The considerable effective length of resilient metal exerting springing force in this type enables adjustment of the clip to compensate for any weakening of the terminals of the clip against the grid leak terminals.

In Fig. 8 I have shown a slightly modified form over the construction shown in Fig. 7, the modification being the position of the integral arm 27 relative to the flange 9. Instead of being pressed back against the flange 9 and diverging backward therefrom so as to provide abundant space for the grid leak, it is bent upward, as shown at 30, otherwise the arm is the same as shown in the other figures, and herein fully described.

This form of clip and grid leak support has one predominate feature not disclosed in any of the other forms, the same being produced by bending the integral spring actuated grid leak clip up from the flange 9 in such a manner that the clip will stand or extend perpendicular to the surface of the condenser. It will thus be seen that by such a formation the grid leak clip is produced in a very compact and efficient manner and is particularly desirable for supporting a short compact grid leak, which is supported therein in the same manner hereinbefore set forth.

In Fig. 9 I have illustrated a further modification in which an arm 31 is formed integral with the clip 6 on one of its diverging edges in a line off center with relation to the clip, with the flange 8 cut or stamped therefrom and to one side thereof. Otherwise this arm 31 takes the same general shape and characteristics as the arms 16 of the form shown in Figs. 1 to 5 inclusive, and has the same identical function.

The difference here involved is the formation of an arm integral with the body portion of the clip which, owing to its particular formation and location with relation to the body of the clip, affords a great saving in material in the process of manufacture. This is a very desirable feature in a device of this type where quantity production is an important factor.

Furthermore, this particular form produces a very substantial grid leak clip that, because of its location, can be readily formed without danger of disturbing the perfect alignment of the clamping flange 10, and avoids any subsequent damage thereto that may be imparted through knocking or jarring or otherwise carelessly handling the grid leak clips. This is an extremely important feature for the reason that the flange 10 should at all times impart a uniform and constant pressure on the condenser plates, otherwise the maximum efficiency of the condenser is destroyed. Uniform capacity is a desirable feature in condensers of these types generally, and capacity is a function of the pressure exerted on the dielectric sheets and condenser plates.

The effective dielectric constant of the condenser will lie between the dielectric constant of air and of mica. The dielectric constant of air is approximately 1 and of mica between 4 and 8. If there be air or air pockets in the dielectric, the effective dielectric constant will be relatively small. If there is a small amount of air included between the condenser plates and a large amount of mica, the effective dielectric constant will be high. Accordingly the desirability of maintaining a constant and uniform pressure is obvious. Again the distance between the active condenser plates is controlling in fixing the capacity of the condenser; a uniform pressure which does not permit the distance between the plates to vary insures uniform capacity.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described my invention, what I claim as new and desire to secure by Letters Patent is:

1. In combination, a condenser unit, cover plates for the unit, a clip, means engaging one of said plates only to secure the clip thereto, the clip having a part engaging the other plate, and means associated with the clip for supporting a grid leak on the condenser.

2. In combination, a condenser unit having cover plates, one of said plates having extensions on its end, clips overlying said extensions and secured thereto, said clips having portions engaging the other plate, and means secured to the clips for mounting a grid leak on the condenser.

3. In combination, a condenser unit having cover plates, one of said plates having extensions on its end, clip overlying said extensions and secured thereto, said clips having portions engaging the other plate, and means secured to the clips for mounting a grid leak on the condenser, said means being in the form of arms projecting away from the condenser.

Signed at New York, in the county of New York and State of New York this 31st day of January, A. D. 1925.

WILLIAM DUBILIER.